United States Patent
Bobrek et al.

(10) Patent No.: US 8,448,007 B2
(45) Date of Patent: *May 21, 2013

(54) POWER CONSUMPTION MANAGEMENT IN A NETWORK DEVICE

(75) Inventors: Pavlo Bobrek, Bradenton, FL (US); Stephen Wethington, Sarasota, FL (US); Hugh Barrass, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,433

(22) Filed: May 11, 2012

(65) Prior Publication Data

US 2012/0269070 A1    Oct. 25, 2012

Related U.S. Application Data

(63) Continuation of application No. 12/420,773, filed on Apr. 8, 2009, now Pat. No. 8,201,006.

(51) Int. Cl.
   *G06F 1/32* (2006.01)
(52) U.S. Cl.
   USPC .......................................... 713/323; 713/320
(58) Field of Classification Search
   USPC .................................. 713/323, 320
   See application file for complete search history.

(56) References Cited

U.S. PATENT DOCUMENTS

| | | | |
|---|---|---|---|
| 6,463,542 B1 | 10/2002 | Yu et al. | |
| 6,795,450 B1 | 9/2004 | Mills et al. | |
| 6,901,072 B1 | 5/2005 | Wong | |
| 7,062,595 B2 | 6/2006 | Lindsay et al. | |
| 7,110,783 B2 | 9/2006 | Bahl et al. | |
| 7,230,933 B2 | 6/2007 | Bahl et al. | |
| 7,444,455 B2 | 10/2008 | Lindsay et al. | |
| 7,903,597 B2 | 3/2011 | Biederman et al. | |
| 8,201,006 B2 * | 6/2012 | Bobrek et al. | 713/323 |
| 2003/0101274 A1 * | 5/2003 | Yi et al. | 709/232 |

(Continued)

FOREIGN PATENT DOCUMENTS

EP    2148471 A1    1/2010

OTHER PUBLICATIONS

Kleinrock et al., "Packet Switching in Radio Channels: New Conflict-Free Multiple Access Schemes," IEEE Trans. on Com., 28: 1015-1029, 1980.

(Continued)

*Primary Examiner* — Chun Cao
(74) *Attorney, Agent, or Firm* — BainwoodHuang (57) ABSTRACT

A method includes buffering an initial amount of data of a data set transmitted from a MAC. When an amount of time for data associated with the data set to fill a PHY buffer approaches an amount of time for a far-end PHY to transition from a second far-end PHY power mode to a first far-end PHY power state, a remaining amount of data of the data set transmitted from the MAC is buffered and the data is transmitted to the far-end PHY after it transitions to the first far-end PHY power state. When the amount of time for data associated with the data set to fill the buffer exceeds the amount of time for the far-end PHY to transition to the first far-end PHY power state, a data delay indicator is transmitted to the MAC to preempt the MAC from transmitting the remaining amount of data.

20 Claims, 4 Drawing Sheets

U.S. PATENT DOCUMENTS

| | | |
|---|---|---|
| 2004/0120334 A1 | 6/2004 | Nation |
| 2005/0013250 A1 | 1/2005 | Kauschke et al. |
| 2005/0030808 A1 | 2/2005 | Brown et al. |
| 2007/0127581 A1 | 6/2007 | Connor et al. |
| 2007/0248118 A1 | 10/2007 | Bishara et al. |
| 2009/0119524 A1 | 5/2009 | Hays |
| 2010/0023658 A1 | 1/2010 | Diab et al. |

OTHER PUBLICATIONS

Lynskey, Eric, "Idle Insertion Using Carrier Sense," IEEE 802.3av Task Force, Jul. 17-19, 2007, San Francisco, CA, 1-10.

"IEEE Draft P802.3azTM/D1.0," LAN/MAN Standards Committee of the IEEE Computer Society, Nov. 2008, 188-197.

* cited by examiner

FIG. 4

POWER CONSUMPTION MANAGEMENT IN A NETWORK DEVICE

BACKGROUND

The present disclosure pertains generally to the field of power management of network devices.

Computer and information networks allow computer systems to exchange content or data. For example, Local Area Networks (LANs) provide communications and allow content exchange between computerized devices in business, campus, and residential environments. The predominant protocol for LAN communications is Ethernet. The Ethernet physical and data link layer (e.g., Layer 1 and Layer 2) specifications define how computerized devices exchange content over various types of physical connections such as twisted wire pairs, coaxial cables, and fiber optic cables.

For example, computerized devices configured for use on a LAN typically include a media access controller (MAC) and a physical interface transceiver (PHY). Conventional MACs are configured in the computerized devices as data link layers. Conventional PHYs connect corresponding MACs to a physical medium, such as a Category 5 twisted-pair wire, and are configured to exchange data between the MAC and the physical medium. In a receive mode, the PHY receives data from the physical medium and decodes the data into a form appropriate for the receiving computerized device. In a transmit mode, the PHY takes data from the computerized device, typically from the MAC, and converts the data into a form appropriate for the physical medium in use.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

Computer devices associated with a network typically draw relatively large amounts of power during operation. On reason behind such a relatively large draw in power involves the amount of time in which the devices draw power. With respect to currently-specified Ethernet devices, during operation, the power draw of the associated PHYs remains relatively constant when either in an active or an idle mode of operation. For example, when in an active mode of operation, such as when transmitting packets at 10 Gigabit/sec, a conventional PHYs typically draws or consume about 8 Watts of power. However, when in an idle mode of operation, such as when not transmitting packets, conventional PHYs consume about 7 Watts of power. Accordingly, Ethernet devices, and specifically PHYs, draw power whether or not the Ethernet devices actively exchange data with other devices in the network. Increases in the cost of energy have increased interest in dynamic power management, wherein power is automatically reduced to a device when it is not fully utilized. For example, this interest in dynamic power management is the motivation for the proposed IEEE-802.3az Ethernet project (i.e., Energy Efficient Ethernet) that primarily deals with dynamic power management of physical layer devices (e.g., PHYs).

It would be desirable for a PHY to be configured to enter a reduced power consumption state when in an idle mode of operation, such as during periods of low link utilization. It would be desirable for the PHY to coordinate normal and reduced power consumption states with a far-end PHY over a link and to maximize the time available for the associated far-end PHY device to transition from the reduced or low-power mode to normal power consumption or operation with minimum cost impact to the PHY.

Generally, a disclosed method includes detecting, by a physical interface transceiver (PHY) of a computerized device, an absence of data transmitted from a media access controller (MAC) of the computerized device, in response to detecting the absence of data transmitted from the MAC, transitioning, by the PHY, between a first power state and a second power state, the PHY while in the second power state being configured to draw less power than the PHY while in the first power state and transmitting to a far-end-PHY in electrical communication with the PHY a notification regarding the transition of the PHY between the first power state and the second power state, the notification causing the far-end PHY to transition between a first far-end PHY power state and a second far-end PHY power state, the far-end PHY while in the second far-end PHY power state being configured to draw less power than the far-end PHY while in the first far-end PHY power state, and buffering an initial amount of data of a data set transmitted from the MAC. When an amount of time for data associated with the data set to fill a buffer associated with the PHY approaches an amount of time for the far-end PHY to transition from the second far-end PHY power state to the first far-end PHY power state, buffering, by the PHY, a remaining amount of data of the data set transmitted from the MAC and transmitting, by the PHY, the data to the far-end PHY after the far-end PHY transitions between the second far-end PHY power state and the first far-end PHY power state. When the amount of time for data associated with the data set to fill the buffer associated with the PHY exceeds the amount of time for the far-end PHY to transition from the second far-end PHY power state to the first far-end PHY power state, transmitting, by the PHY, a data delay indicator to the MAC, the data delay indicator configured to preempt the MAC from transmitting the remaining amount of data of the data set to the PHY.

DESCRIPTION OF EXAMPLE EMBODIMENTS

Figure 1:
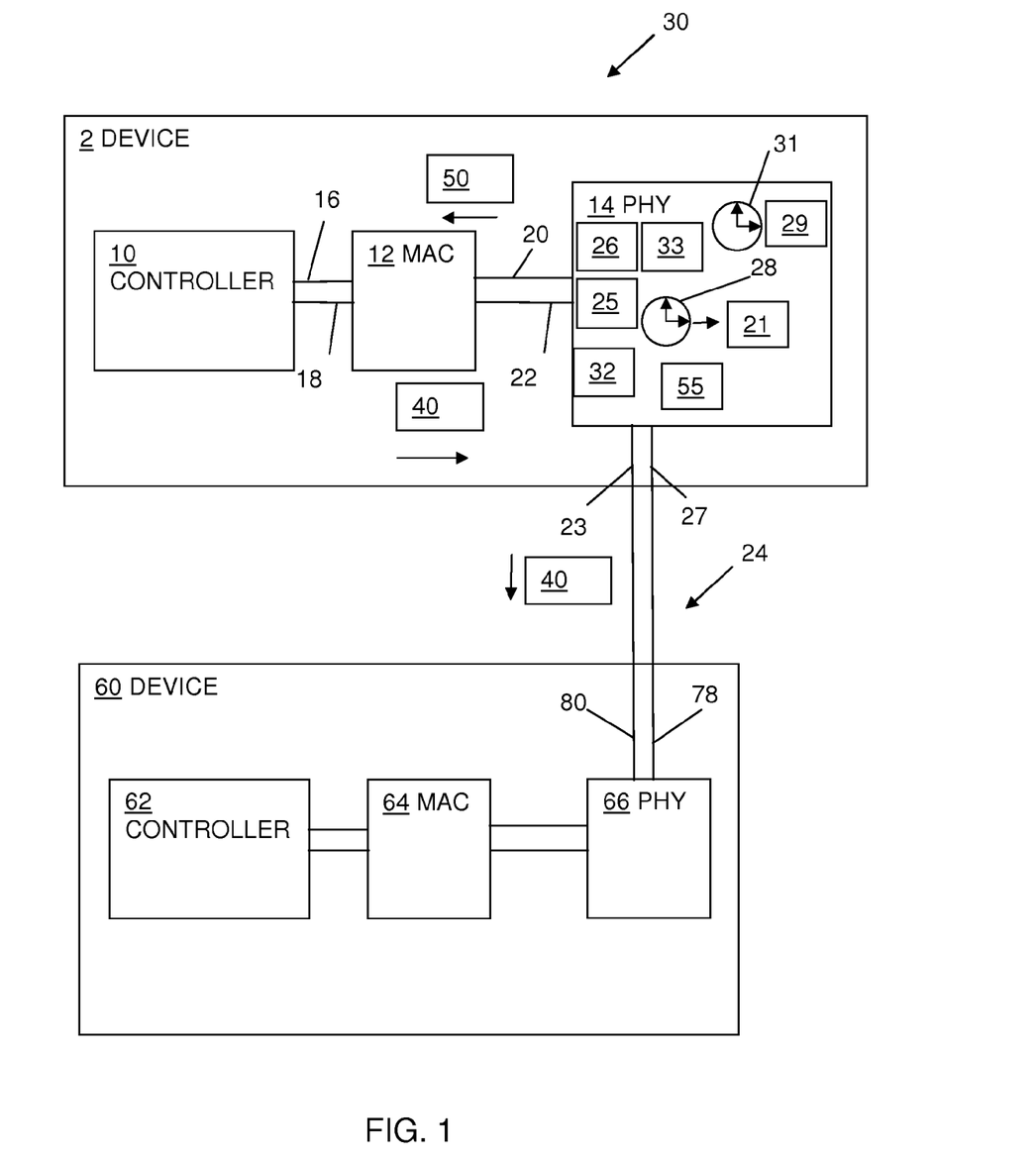
FIG. 1 illustrates a block diagram of a computerized device having a set of components.

FIG. 1 illustrates a block diagram of a computerized device 2 having a set of components 4 that form a communication path. In one arrangement, the computerized device 2 is configured as an Ethernet device, such as a personal computer, an Internet Protocol (IP) phone, or an access point. In such an arrangement, the computerized device 2 includes a controller 10, a media access controller (MAC) 12, and a physical interface transceiver (PHY) 14 which constitutes the set of components. The controller 10 in one arrangement includes a processor or central processing unit (CPU) and a memory and is disposed in electrical communication with the MAC 12. For example, the controller 10 in electrical communication with the MAC 12 a transmit path 16 and a receive path 18 disposed. The MAC 12 is configured as a data link layer and is in electrical communication with the PHY 14 via a transmit path 20 and a receive path 22.

The PHY 14 is configured to exchange data between the MAC 12 and a physical medium, such as a Category 5 twisted-pair wire. The PHY 14 can be configured in a variety of ways. For example, the PHY 14 can be configured as a Serial Media Independent Interface (SMII), a Serial Gigabit Media Independent Interface (SGMII), a 10 Gigabit Attachment Unit Interface (XAUI), or a High Speed Serial Interface for XFP (XFI). The PHY 14 includes a transmit buffer 25, a receive buffer 26, and one or more clocks or timers 28. As will be discussed in detail below, the transmit buffer 25 is configured to store data received from the MAC 12. While the buffers 25, 26 can be configured in a variety of ways, in one arrangement, the buffers 25, 26 are configured to store approximately 50 microseconds of data. The timer 28 is configured to enable the PHY 14 to self-control its transitions from a first power state to a second or low-power state and vice versa.

Figure 3:
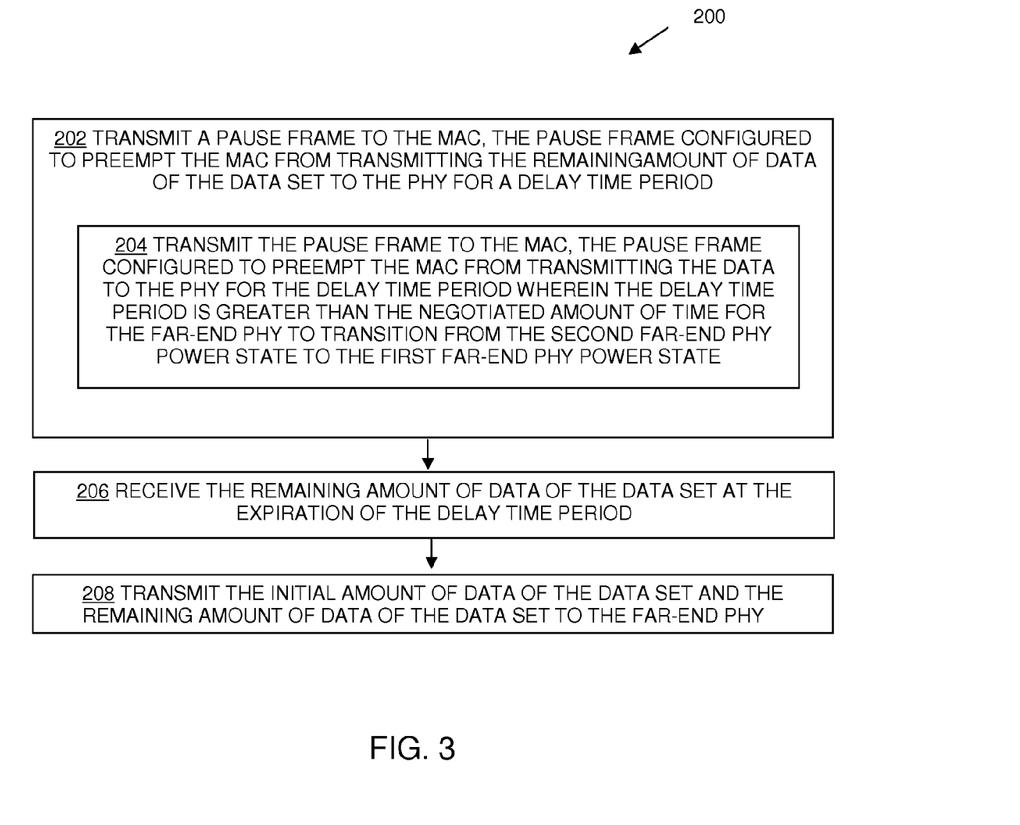
FIG. 3 is a flow diagram depicting a method of operation of the computerized device of FIG. 1 according to a one embodiment.

In one arrangement, the computerized device 2 forms part of a network 30 with one or more secondary computerized devices. For example, FIG. 3 illustrates an example of a network 30 such as a Local Area Network (LAN), an Ethernet network, or a Wide Area Network having the computerized device 2, such as a personal computer, interconnected, via a connector or link 24, with a second computerized device 60, such as a second personal computer. As shown, the device 60 includes a controller 62, a MAC 64, and a PHY 66, termed herein as a far-end PHY, disposed in electrical communication with each other. The far-end PHY 66 is disposed in electrical communication with the physical medium 24 via a transmit path 78 and a receive path 80 that, in turn is disposed in electrical communication with a receive path 23 and a transmit path 27 associated with the PHY 14 of the device 2.

As will be described in detail below, during operation the PHY 14 is configured to work in conjunction with the MAC 12 to enter and exit a low power drawing state during operation of the computerized device 2. Accordingly, the PHY 14 achieves a power savings without modification to the MAC 12.

Figure 2:
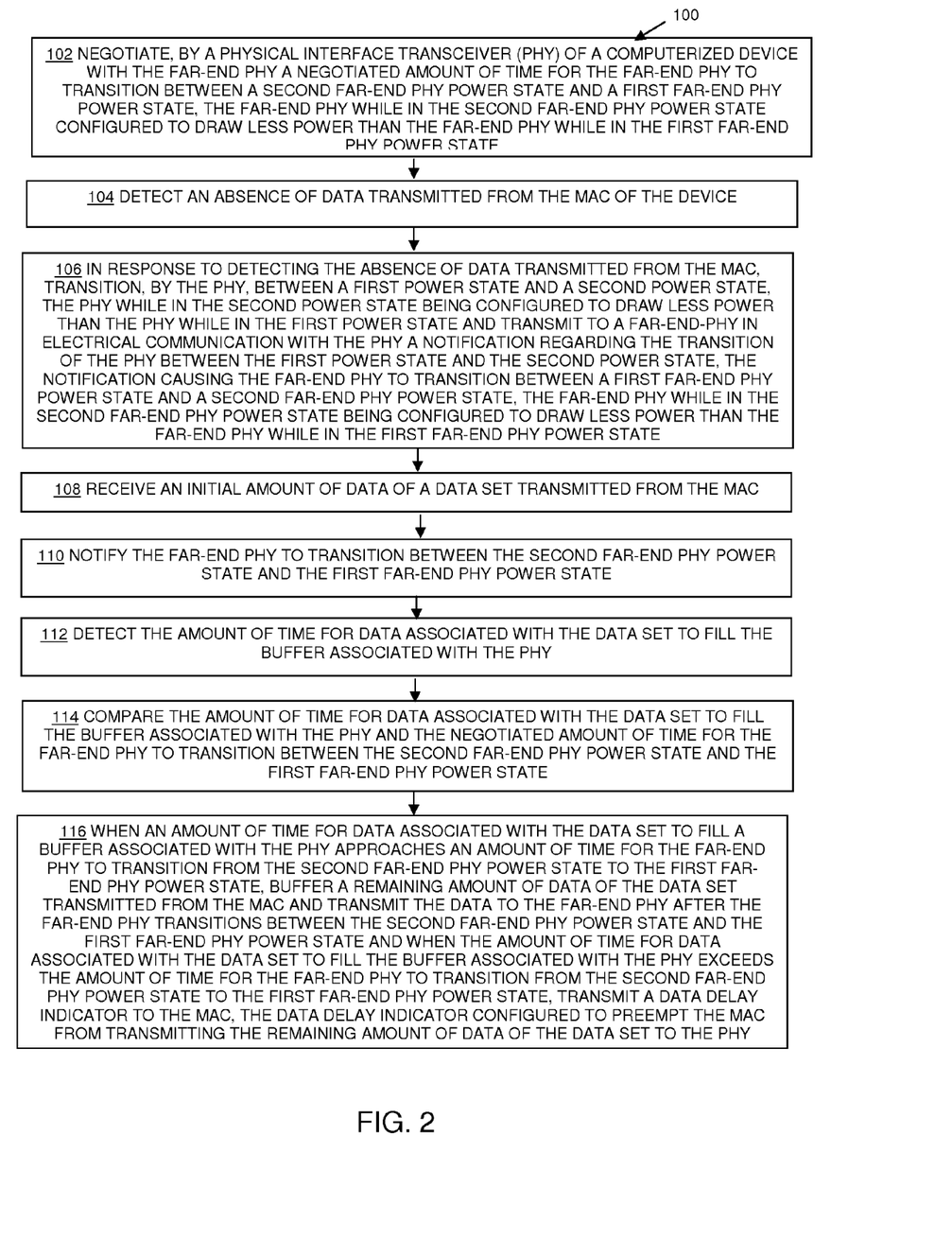
FIG. 2 is a flow diagram depicting a method of operation of the computerized device of FIG. 1 according to a one embodiment.

FIG. 2 is a flow diagram 100 depicting a method of operation of the computerized device of FIG. 1 according to a one embodiment.

In step 102, the PHY 14 is configured to negotiate with the far-end PHY 66 a negotiated amount of time 33 for the far-end PHY 66 to transition between a second far-end PHY power state and a first far-end PHY power state, the far-end PHY while in the second far-end PHY power state configured to draw less power than the far-end PHY while in the first far-end PHY power state. For example, both PHY 14 and PHY 66 are configured to enter into a reduced power state. Through the exchange of time negotiation messages, the PHY 14 and the far-end PHY 66 negotiate and mutually establish a negotiated time duration (e.g., a wake-up time) for each of the PHY 14 and the far-end PHY 66 to transition between a low power drawing state and a normal or operational power drawing state.

In step 104, the PHY 14 detects an absence of data transmitted from the MAC 12 of the computerized device 2. For example, during operation of the computerized device 2, as the MAC 12 receives data, the MAC 12 transmits data to the PHY 14. The data enters the transmit buffer 25 which the PHY 14 drains in the course of normal operation, transmitting the content of the transmit buffer 25 to the far-end PHY 66 of the computerized device 60. In one arrangement, when the transmit buffer 25 is empty, the PHY 14 initiates the timer 28 to measure a time duration over which the PHY 14 does not receive data from the MAC 12. As the timer 28 counts the time duration, the timer 28 generates a timer value in a substantially continuous manner. Also in a substantially continuous manner, the PHY 14 compares the timer value generated by the timer 28 with a threshold time value 32, such as preset by a user. When the PHY 14 detects, based upon the comparison, that the timer value reaches the threshold time value 32, such detection indicates an absence of data transmitted from the MAC 12.

In step 106, in response to detecting the absence of data transmitted from the MAC 12, the PHY 14 in response to detecting the absence of data transmitted from the MAC 12, the PHY 14 transitions between a first power state and a second power state, the PHY 14 while in the second power state being configured to draw less power than the PHY 14 while in the first power state. In one arrangement, when the PHY 14 detects the absence of data transmitted from the MAC 12 the PHY 14 enters the second power state (e.g., an IEEE low power mode) where the PHY 14 draws a reduced amount of power relative to standard operation. For example, in response to detecting the absence of data transmitted from the MAC 12, the PHY 14 deactivates port logic associated with a port of the transmit path 26. By deactivating the port logic associated with the port of the transmit path 26, the PHY 14 draws a reduced amount of power relative to an amount of power drawn when the port is active (i.e., enters a reduced or second power state). For example, when transmitting packets at 10 Gigabit/sec, the PHY 14 can draw about 8 Watts of power. However, in response to deactivating port logic associated with a port of the transmit path 26, the PHY 14 can draw less power.

Furthermore in step 106, the PHY 14 transmits to a far-end-PHY 66 a notification regarding the transition of the PHY 14 between the first power state and the second power state, the notification causing the far-end PHY 66 to transition between a first far-end PHY power state and a second far-end PHY power state, the far-end PHY 66 while in the second far-end PHY power state being configured to draw less power than the far-end PHY 66 while in the first far-end PHY power state. For example, in response to detecting the absence of data transmitted from the MAC 12, the PHY 14 notifies the far-end PHY 66 that the PHY 14 is entering a reduced or second power state. Accordingly, the PHY 14 transmits the notification to the far-end PHY 66. In the computerized device 60, the far-end PHY 66 receives the notification from the PHY 14 via the link 24. In response to the content of the notification, the far-end PHY 66 deactivates port logic associated with a port of a receive path. By deactivating the port logic associated with the port of the receive path, the far-end PHY 66 enters a second or reduced far-end PHY power state and draws a reduced amount of power relative to an amount of power drawn when the port is active.

In step 108, the PHY 14 receives an initial amount of data of a data set 40 transmitted from the MAC 12. For example, during operation of the computerized device 2, the MAC 12 does not receive a notification regarding the power state of the PHY 14. Accordingly, when the MAC 12 has data to transmit to the PHY 14, the MAC 12 commences transmission regardless of the power state of the PHY 14. When the PHY 14 receives the initial amount of data of a data set 40 (i.e., the start of the transmission of the data), such as a jumbo frame, the PHY 14 stores the initial amount of data in the transmit buffer 25.

In step 110, the PHY 14 notifies the far-end PHY 66 to transition between the second far-end PHY power state and the first far-end PHY power state. For example, as indicated above, the transmit buffer 25 of the PHY 14 is configured to hold a relatively small amount of data (e.g., approximately 50 microseconds of data). Accordingly, to avoid a loss of data, the PHY 14 transmits a message to the far-end PHY 66 to cause the far-end PHY 66 to transition from the second far-end PHY power state to the first far-end PHY power state such that the far-end PHY 66 can receive the data of the data set 40.

During operation, the PHY 14 is configured to postpone transmission of the data received from the MAC 12 until the far-end PHY 66 transitions between the second far-end PHY power state and the first far-end PHY power state. However, the operation of the PHY 14 is dependent upon whether the time to fill the buffer 25 associated with PHY 14 is greater than the transition time from the second far-end PHY power state to the first far-end PHY power state (i.e., second power state time duration) of the far-end PHY 66. Accordingly, in step 112, the PHY 14 detects the amount of time for data associated with the data set 40 to fill the buffer 25 associated with the PHY 14. For example, after the PHY 14 receives the initial amount of data of a data set 40 from the MAC 12, the PHY 14 initializes the clock 28 which generates a clock output 21 associated with the amount of time for data received from the MAC 12 to fill the buffer 25. Next, as indicated in step 114, the PHY 14 compares the amount of time 21 for data associated with the data set 40 to fill the buffer 25 associated with the PHY 14 and the negotiated amount of time 33 for the far-end PHY 66 to transition between the second far-end PHY power state and the first far-end PHY power state. For example, the PHY 14 compares the clock output 21 with the negotiated amount of time 33.

As indicated in step 116, based upon the comparison, when the amount of time for data associated with the data set 40 to fill the buffer 25 associated with the PHY 14 approaches the negotiated amount of time 33 for the far-end PHY 66 to transition from the second far-end PHY power state to the first far-end PHY power state, the PHY 14 buffers the remaining amount of data of the data set 40 transmitted from the MAC 12 and transmits the data set 40 to the far-end PHY 66 after the far-end PHY transitions between the second far-end PHY power state and the first far-end PHY power state. For example, assume the PHY 14 detects that the amount of time for data associated with the data set 40 to fill the buffer 25 is less than or is equal to the negotiated amount of time 33 for the far-end PHY 66 to transition from the second far-end PHY power state to the first far-end PHY power state. In such a case, the buffer 25 of the PHY 14 buffers the data of the data set 40. Additionally, while the PHY 14 buffers the data 40 that it is receiving from the MAC in buffer 25, the PHY 14 initiates a timer or clock 31 to measure the time duration over which far-end PHY 66 transitions between the second far-end PHY power state and the first far-end PHY power state. As the timer 31 counts the time duration, the timer 31 generates a timer value 29 in a substantially continuous manner. Also in a substantially continuous manner, the PHY 14 compares the timer value 29 generated by the timer 31 with the negotiated amount of time 33. When the PHY 14 detects that, based upon the comparison, the timer value 29 reaches (e.g., is equal to) or exceeds the negotiated amount of time 33, the PHY 14 detects the far-end PHY 66 as having transitioned from the second far-end PHY power state to the first far-end PHY power state and transmits the data stored in buffer 25 to the far-end PHY 66.

Also as indicated in step 116, when the amount of time for data associated with the data set 40 to fill the buffer 25 associated with the PHY 14 exceeds the negotiated amount of time 33 for the far-end PHY 66 to transition from the second far-end PHY power state to the first far-end PHY power state, the PHY 14 transmits a data delay indicator 50 to the MAC 13, the data delay indicator 50 configured to preempt the MAC 12 from transmitting the remaining amount of data of the data set 40 to the PHY 12. For example, assume the PHY 14 detects that the amount of time for data associated with the data set 40 to fill the buffer 25, without loss, is greater than the negotiated amount of time 33 for the far-end PHY 66 to transition from the second far-end PHY power state to the first far-end PHY power state. In such a case, the PHY 14 retains the initial amount of data of the data set 40 previously received from the MAC 12 in its transmit buffer 25. The PHY 14 also transmits the data delay indicator 50 to the MAC 12 to cause the MAC 12 to withhold further transmission of data to the PHY 14 until the far-end PHY 66 transitions from the second far-end PHY power state to the first far-end PHY power state. In one arrangement, a delay time period associated with the data delay indicator 50 is equal to or exceeds the negotiated amount of time 33 for the far-end PHY 66 to transition from the second far-end PHY power state to the first far-end PHY power state. Accordingly, with expiration of the delay time period, the PHY 14 receives the data 40 from the MAC 12 and transmits the data 40 to the far-end PHY 66, such as illustrated in FIG. 1.

In the computerized device 2, the PHY 14 is configured to control its transition between a first, active power state and a second, reduced power state based upon an absence of data received from the MAC 12. Accordingly, the PHY 14 is adapted to operate in a reduced power mode based upon the amount of data traffic provided by the MAC 12. With such a configuration, the PHY 14 can operate in an energy-efficient mode while connected to a MAC 12. Additionally, the PHY 14 is configured to utilize the data delay indicator 50 to extend the amount of time required by the far-end PHY 66 to transition from a reduced power state to an active power state beyond what is typically achievable by only employing the buffer 25 in the PHY 14. Accordingly, with such a configuration the PHY 14 minimizes the amount of buffer storage required in order to interoperate with a MAC 12. Also with such a configuration, the PHY 14 operates with an existing port and stub ASIC without requiring additional external logic or additional PHY pins.

As indicated above, the PHY 14 utilizes a data delay indicator 50 to extend the amount of time required by the far-end PHY 66 to transition from a reduced power state to an active power state. The data delay indicator 50 can have a variety of configurations. In one arrangement, the data delay indicator 50 is configured as a pause frame (e.g., an IEEE 802.3x pause frame). Certain conventional MACs 14 are configured to utilize pause frames to control the flow of data along a communication line and, specifically, to halt the transmission of data for a given time period.

FIG. 3 is a flow diagram 200 depicting a method of operation of the PHY 14 with respect to the use of pause frames.

In step 202, the PHY 14 transmits a pause frame to the MAC 12, the pause frame configured to preempt the MAC 12 from transmitting the remaining amount of data of the data set 40 to the PHY 14 for a delay time period. For example, as indicated above the PHY 14 detects the amount of time for the far-end PHY 66 to transition between the second power state and the first power state. When the PHY 14 receives the initial amount of data from the MAC 12, the PHY 14 compares the amount of time 21 for data associated with the data set 40 to fill the buffer 25 associated with the PHY 14 and the negotiated amount of time 33 for the far-end PHY 66 to transition between the second far-end PHY power state and the first far-end PHY power state. When the amount of time for data associated with the data set 40 to fill the buffer 25 associated with the PHY 14 exceeds the negotiated amount of time 33 for the far-end PHY 66 to transition from the second far-end PHY power state to the first far-end PHY power state, the PHY 14 transmits the pause frame to the MAC 12 in order to stop the MAC 12 from transmitting the remaining data of the data set to the PHY 14 for a given period of time. While the pause frame can stop the MAC 12 from transmitting additional data to the PHY 14 for any period of time, in one arrangement, as indicated in step 204, the delay time period is greater than the negotiated amount of time 33 for the far-end PHY 66 to transition from the second far-end PHY power state to the first far-end PHY power state. Such a configuration allows the far-end PHY 66 to transition from the second far-end PHY power state to the first far-end PHY power state (i.e., from the reduced power state to the active power state) while minimizing the necessity for the PHY 14 to buffer data from the MAC 12. Once the MAC 12 enters a pause state, the MAC 12 only transmits relatively small control frames to the PHY 14. The MAC 12 buffers all other data until the delay time period associated with the pause frame expires.

At the expiration of the delay time period, as indicated in step 206, the PHY 14 is configured to receive the remaining data of the data set. For example, at the expiration of the pause frame, the far end PHY 66 has transitioned from the second far-end PHY power state to the first far-end PHY power state (i.e., from the reduced power state to the active power state). At such time, the delay time period expires and the MAC 12 resumes transmission of the remaining data to the PHY 14. As indicated in step 208, as the PHY 14 receives the data 40, the PHY transmits the data 40 (i.e., the initial amount of data and the remaining amount of data of the data set) to the far-end PHY 66, such as illustrated in FIG. 1.

As indicated above, the data delay indicator 50 can have a variety of configurations. In one arrangement, such as for 10/100 MB/s Ethernet, the data delay indicator 50 is configured as an MII Carrier Sense (CRS) signal. For example, certain computerized devices are configured with a carrier-sense multiple access protocol (e.g., such as defined by IEEE 802.3) that allows for collision detection among packets from multiple devices. In such an arrangement, the CRS signal is used to indicate that another MAC is transmitting on a shared communication link. Furthermore, a MAC that has initiated and is already engaged in the transmission of data will ignore the assertion of CRS. Thus, in order to minimize opportunities for data collisions to occur on a shared communication link, each MAC sharing the communication link is configured in half-duplex mode and, as such, will not initiate transmission of data while CRS is asserted. Nonetheless, an opportunity exists for such collisions to occur, for example, when CRS is not asserted and two MACs simultaneously begin transmission. Such collision detection by the PHYs sharing the communication link is indicated by the assertion of a collision detect signal (COL). When a MAC configured in half-duplex mode detects the assertion of COL by the PHY, it ceases transmission of data frame and waits for a random interval before retransmission of the same data frame in its entirety.

In one arrangement, to utilize CRS and COL in an energy-efficient mode, the MAC 12 is configured for half-duplex operation. In this arrangement, when configured in half-duplex mode, an assertion of collision detect (COL) and carrier sense (CRS) by the PHY 14 relative to the MAC 12 suppresses transmission of the present data frame, the entirety of said data frame remaining preserved by MAC 12 for retransmission when the PHY 14 deasserts CRS. In this arrangement, the PHY 14 deasserts COL when the MAC 12 deasserts transmission enable (TX_EN) to indicate that MAC 12 has ceased data transmission. Following the deassertion of COL, PHY 14 continues to assert CRS to suppress transmission of data by MAC 12 for a time sufficient for the far-end PHY 66 to transition from the second power state to the first power state (i.e., second power state time duration).

Figure 4:
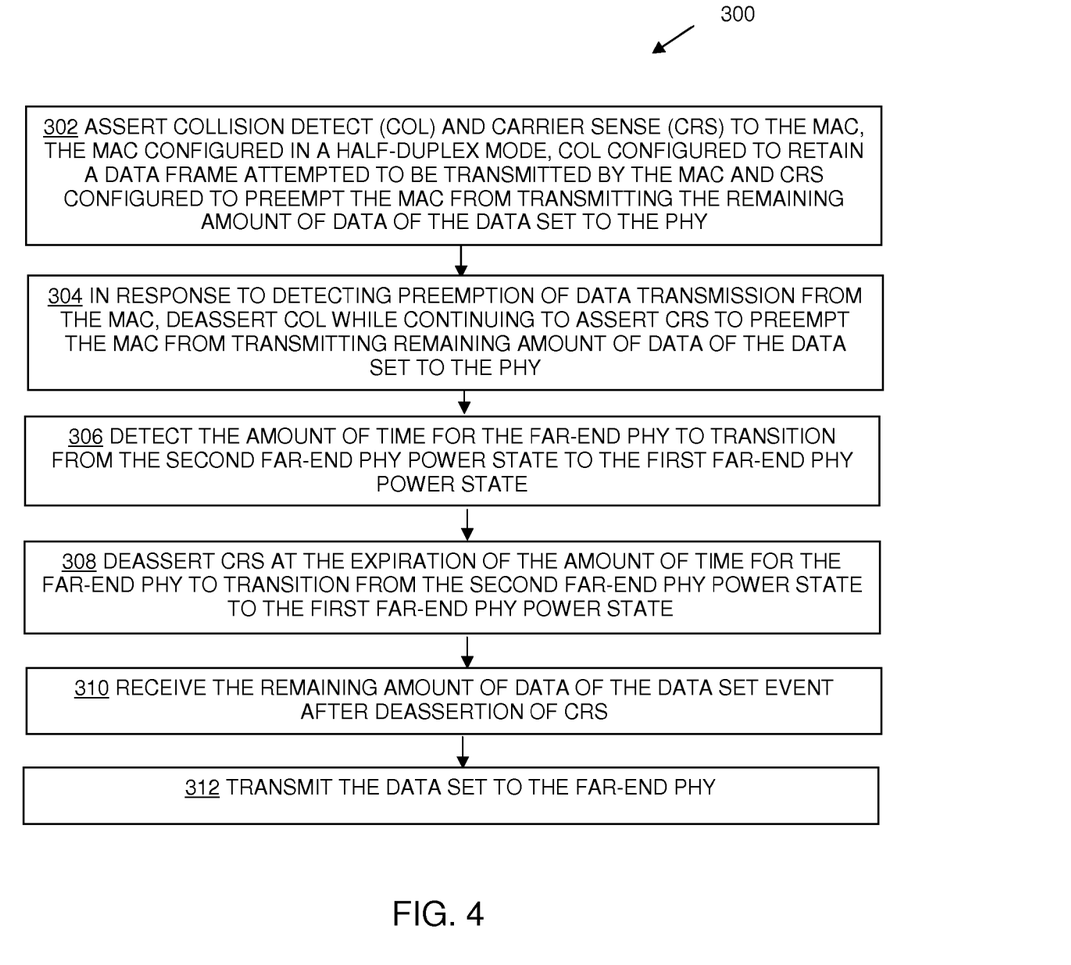
FIG. 4 is a flow diagram depicting a method of operation of the computerized device of FIG. 1 according to a one embodiment.

FIG. 4 is a flow diagram 300 depicting a method of operation of the PHY 14 with respect to the use of CRS.

In step 302, when transmitting the data delay indicator to the MAC 12, the PHY 14 asserts collision detect (COL) and carrier sense (CRS) to the MAC 12, the MAC 12 being configured in a half-duplex mode. For example, when the PHY 14 receives the initial amount of data of a data set 40 transmitted from the MAC 12 and when the amount of time for data associated with the data set to fill the buffer associated with the PHY exceeds the amount of time for the far-end PHY to transition from the second far-end PHY power state to the first far-end PHY power state, the PHY 14 is configured to assert COL (i.e., spoof a collision) to cause the MAC 12 to retain a data frame being transmitted when COL was asserted. Additionally the PHY 14 is configured to assert CRS to cause the MAC 12 to preempt transmission of the remaining amount of data to the PHY 14.

Next, as indicated in step 304, in response to detecting, by the PHY 14, preemption of data transmission from the MAC 12, deasserting COL while continuing to assert CRS to preempt the MAC 12 from transmitting data to the PHY 14 for the delay time period. For example, in response to the assertion of COL, the MAC 12 stops transmitting data and deasserts TX_EN, causing the PHY to deassert COL, while continuing to assert CRS, thereby causing the MAC 12 to preempt transmission of the remaining amount of data to the PHY 14.

In step 306, the PHY 14 detects the amount of time for the far-end PHY to transition from the second far-end PHY power state to the first far-end PHY power state. For example, the PHY 14 retrieves the negotiated amount of time 33, initiates the timer 31 to measure the time duration over which far-end PHY 66 transitions between the second far-end PHY power state and the first far-end PHY power state, and compares the timer value 29 generated by the timer 31 with the negotiated amount of time 33. The PHY 14 continues to assert CRS relative to the MAC 12 in order to stop the MAC 12 from transmitting the remaining amount of data to the PHY 14 for a period of time sufficient for PHY 66 to transition from the first power state to the second power state (i.e., second power state time duration), as indicated by continuous comparison of timer 28 with threshold 32.

In step 308, the PHY 14 then deasserts CRS at the expiration of the amount of time for the far-end PHY 66 to transition from the second far-end PHY power state to the first far-end PHY power state. For example, the PHY 14 deasserts CRS when the timer value 29 generated by the timer 31 is equal to or exceeds the negotiated amount of time 33. By deasserting CRS after the expiration of the second power state time duration, the PHY 14 allows the far-end PHY 66 to transition between the second far-end PHY power state (i.e., reduced power state) and the first far-end PHY power state (i.e., the active power state). In response to deassertion of CRS, the MAC 12 retransmits the data frame that experienced the collision detect (COL) event and continues transmission of the remaining amount data to the PHY 12. Accordingly, as indicated in step 310, the PHY 14 receives data associated with the data event after deassertion of CRS and, as indicated in step 312, transmits the data to the far-end PHY 66.

While various embodiments of the invention have been particularly shown and described, it will be understood by those skilled in the art that various changes in form and details may be made therein without departing from the spirit and scope of the invention as defined by the appended claims.

For example, as indicated above, in one arrangement, to utilize CRS in an energy-efficient mode, the MAC 12 is configured for half-duplex operation. It should be noted that in this arrangement, the MAC 12 can still operate in full duplex mode, even though it is configured for half-duplex operation. This is accomplished by having the PHY decouple assertion of RX_DV and CRS when full duplex operation is desired. It is CRS, and not RX_DV that affects whether or not the MAC 12 transmits data and it is RX_DV, and not CRS, that determines whether or not the MAC 12 should receive data.

As described above, in one arrangement, in response to detecting an absence of data transmitted from the MAC 12, the PHY 14 transitions between a first power state and a second power state where the PHY 14 in the second power state draws less power than the PHY 14 in the first power state. Such description is by way of example only. In one arrangement, in addition to detecting an absence of data transmitted from the MAC 12, the PHY 14 is configured to assert CRS to the MAC 12 when the MAC 12 attempts to recommence data transmission in order to cause MAC 12 to suppress transmission of data by the MAC 12 and cause the MAC 12 to preserve all data pending transmission for a given duration of time while the PHY 14 engages the second power state.

As indicated above, in one arrangement, to utilize CRS in an energy-efficient mode, the MAC 12 is configured for half-duplex operation. However, in conventional systems, a CRS signal is used to inform a full-duplex configured MAC that a rival MAC is currently using the shared medium and therefore the MAC should defer transmission until the carrier is free. For a simple, full-duplex operation, the CRS signal is asserted only when the local MAC is transmitting and therefore never causes deferral.

In one arrangement, to utilize CRS in an energy efficient mode, the MAC 12 is configured for full-duplex operation. In this arrangement, an assertion of carrier sense CRS will have no effect on the frame in progress (i.e., the data frame being transmitted by the MAC) but will preempt the MAC 12 from sending further data frames until the signal is deasserted. Receive operation is unaffected by this operation, as the collision detect signal (COL) is never asserted. For example, assume the MAC 12 configured in a full-duplex mode. With such a configuration, the PHY can assert CRS relative to the MAC, such as a result of detecting a data event. Such assertion causes the MAC 12 to defer from sending a data frame to the PHY 14 while CRS is asserted.

As indicated above, with respect to step 202, the PHY 14 transmits a pause frame to the MAC 12, the pause frame configured to preempt the MAC 12 from transmitting the remaining amount of data of the data set 40 to the PHY 14 for a delay time period. In one arrangement, before the PHY 14 can transmit the pause frame to the MAC 12, in order to avoid a collision, the PHY 14 ensures that the far-end PHY 66 is not transmitting data (i.e., frames) to the MAC 12. For example, during operation the PHY 14 is configured to monitor the receive path 23 for data transmitted from the far-end PHY 66. In the case where the PHY 14 detects the presence of an interframe gap (IFG) transmitted from the far-end PHY 66, the PHY 14 detects an idle period between the transmission of Ethernet frames from the far-end PHY 66 to the MAC 12. Accordingly, when the PHY 14 detects such an idle period, the PHY 14 transmits the pause frame to the MAC 12. Additionally, the PHY 14 is configured with a secondary buffer 55 to store frames received from the far-end PHY 66 following receipt of the IFG. The secondary buffer 55 minimizes loss of data received from the far-end PHY 66 while the PHY 14 transmits the pause frame to the MAC 12.

What is claimed is:

1. A physical interface transceiver (PHY) for use as a local PHY in a network device, comprising:
   a transmit buffer for storing data received from a local media access controller (MAC) co-located with the local PHY, the data to be transmitted on a communications link to far-end PHY of a remote communications device; and
   timing and control circuitry configured to:
   monitor for transmission of data by the local MAC when the far-end PHY is in a low-power operating state in which it cannot receive a data transmission from the local MAC;
   upon detecting transmission of data by the local MAC, buffering an initial amount of the data in the transmit buffer and sending a notification to the far-end PHY causing the far-end PHY to transition to a higher-power operating state over a wake-up interval; and
   selectively sending a data delay indicator to the local MAC based on a relationship between the wake-up interval and a time-measured size of the transmit buffer, the data delay indicator causing the local MAC to cease transmission of data and being sent when the relationship between the wake-up interval and the time-measured size of the transmit buffer would result in overrunning the transmit buffer if transmission by the local MAC were permitted to continue throughout the wake-up interval.

2. A PHY according to claim 1, wherein the timing and control circuitry is configured to negotiate the wake-up interval with the far-end PHY prior to transmission of data by the local MAC.

3. A PHY according to claim 1, wherein when the data delay indicator is a pause frame operative to prevent the local MAC from transmitting data for a determined delay time period.

4. A PHY according to claim 3, wherein the delay time period is greater than the wake-up interval.

5. A PHY according to claim 1, wherein the timing and control circuitry is further configured to:
   receive a remaining amount of data from the local MAC upon expiration of a delay time period; and
   transmit the initial amount of data and the remaining amount of data to the far-end PHY.

6. A PHY according to claim 1, wherein the timing and control circuitry is further configured to transition the local PHY from a local low-power operating state to a local higher-power operating state upon detecting the transmission of data by the local MAC.

7. A PHY according to claim 6, wherein the timing and control circuitry is further configured to transition the local PHY into the local low-power operating state from the local higher-power operating state at a time prior to the transmission of data by the local MAC.

8. A PHY according to claim 7, wherein transitioning the local PHY into the local low-power operating state includes detecting an absence of transmission of data by the local MAC for a predetermined period.

9. A PHY according to claim 8, where the predetermined period is a time value preset by a user.

10. A PHY according to claim 8, wherein transitioning the local PHY into the local low-power operating state includes deactivating port logic associated with a port of a transmit path to the far-end PHY.

11. A method of operating a physical interface transceiver (PHY) as a local PHY in a network device, comprising:
   using a transmit buffer for storing data received from a local media access controller (MAC) co-located with the local PHY, the data to be transmitted on a communications link to far-end PHY of a remote communications device;
   monitoring for transmission of data by the local MAC when the far-end PHY is in a low-power operating state in which it cannot receive a data transmission from the local MAC;
   upon detecting transmission of data by the local MAC, buffering an initial amount of the data in the transmit buffer and sending a notification to the far-end PHY causing the far-end PHY to transition to a higher-power operating state over a wake-up interval; and
   selectively sending a data delay indicator to the local MAC based on a relationship between the wake-up interval and a time-measured size of the transmit buffer, the data delay indicator causing the local MAC to cease transmission of data and being sent when the relationship between the wake-up interval and the time-measured size of the transmit buffer would result in overrunning the transmit buffer if transmission by the local MAC were permitted to continue throughout the wake-up interval.

12. A method according to claim 11, further including negotiating the wake-up interval with the far-end PHY prior to transmission of data by the local MAC.

13. A method according to claim 11, wherein when the data delay indicator is a pause frame operative to prevent the local MAC from transmitting data for a determined delay time period.

14. A method according to claim 13, wherein the delay time period is greater than the wake-up interval.

15. A method according to claim 11, further including:
   receiving a remaining amount of data from the local MAC upon expiration of a delay time period; and
   transmitting the initial amount of data and the remaining amount of data to the far-end PHY.

16. A method according to claim 11, further including transitioning the local PHY from a local low-power operating state to a local higher-power operating state upon detecting the transmission of data by the local MAC.

17. A method according to claim 16, further including transitioning the local PHY into the local low-power operating state from the local higher-power operating state at a time prior to the transmission of data by the local MAC.

18. A method according to claim 17, wherein transitioning the local PHY into the local low-power operating state includes detecting an absence of transmission of data by the local MAC for a predetermined period.

19. A method according to claim 18, where the predetermined period is a time value preset by a user.

20. A method according to claim 18, wherein transitioning the local PHY into the local low-power operating state includes deactivating port logic associated with a port of a transmit path to the far-end PHY.

* * * * *